C. S. BONNEY.
TOOL HOLDER.
APPLICATION FILED DEC. 17, 1909.
973,254.
Patented Oct. 18, 1910.
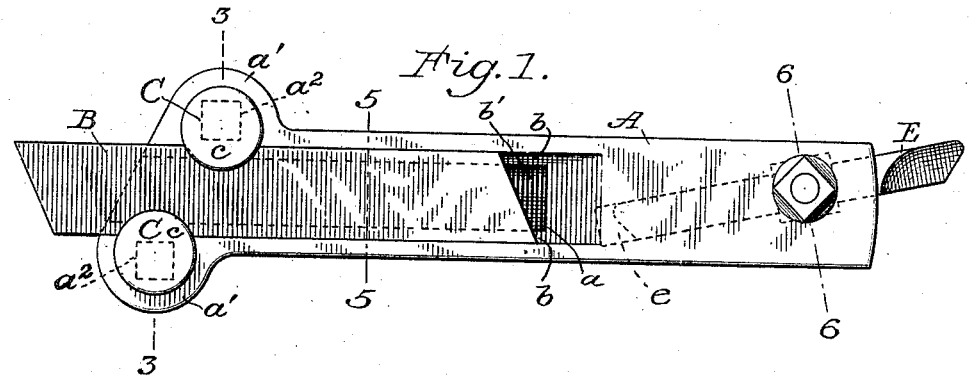
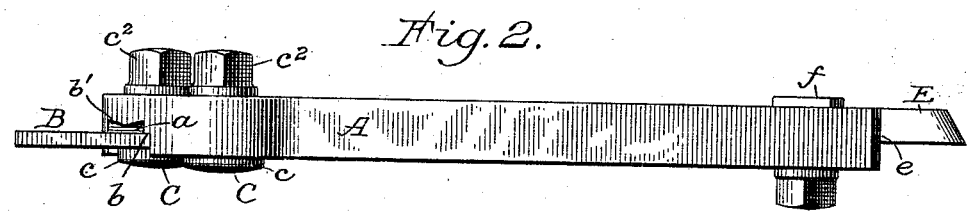
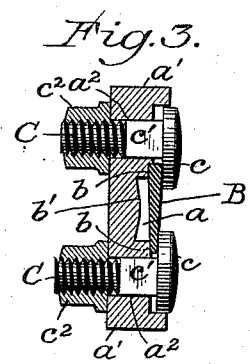 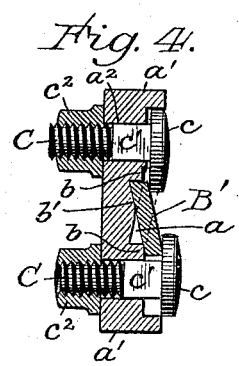
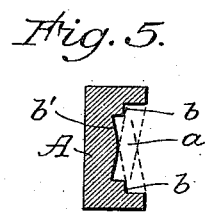 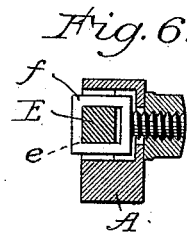
Attest:
Rose Berg.
Paul Finckel
Inventor:
Charles S. Bonney,
By Nowell Battle
Attorney.
THE NORRIS PETERS CO., WASHINGTON, D. C.

UNITED STATES PATENT OFFICE.

CHARLES S. BONNEY, OF IRVINGTON, NEW JERSEY.

TOOL-HOLDER.

973,254.

Specification of Letters Patent. Patented Oct. 18, 1910.

Application filed December 17, 1909. Serial No. 533,719.

*To all whom it may concern:*

Be it known that I, CHARLES S. BONNEY, a citizen of the United States, and resident of Irvington, county of Essex, and State of New Jersey, have invented certain new and useful Improvements in Tool-Holders, of which the following is a specification.

The invention relates more particularly to a holder which may be inserted in the tool-post of a lathe for receiving and holding turning, facing and cutting-off tools or bit-pieces and the object of the invention is to provide a holder adapted to receive a number of different tools to obviate the necessity of separate holders for each tool.

To more particularly describe my invention I will refer to the accompanying drawings in which—

Figure 1, is a side elevation of a tool holder embodying my invention. Fig. 2, is a top or plan view of the same. Fig. 3, is a section taken on line 3—3 of Fig. 1. Fig. 4 is a section similar to Fig. 3, showing a bit or tool clamped in the holder at an angle thereto. Fig. 5, is a section of the holder taken on line 5—5 of Fig. 1, and Fig. 6, is a section taken on line 6—6 of Fig. 1.

The body or stock of the holder is composed of a substantially flat bar A adapted to enter the tool-post socket of a lathe or similar machine. Said bar is provided with a channel $a$ along one side, which is adapted to receive a cutting-off tool or bit B, or a right or left-hand facing tool. The channel has a depth greater than the thickness of the tools, and its side walls are each provided with a step which forms a tool bearing surface $b$, this surface being preferably about midway between the outer surface of the holder and the bottom wall $b'$ of the channel. Each of these bearing surfaces $b$, $b$ are adapted to coöperate with each other for positioning a cutting-off tool B in proper relation to the holder, *i. e.*, with its median line parallel with the vertical plane of the holder; or said surfaces $b$ may each coöperate with the bottom wall $b'$ of the channel for properly positioning a right or left hand facing tool B', as indicated in Figs. 4 and 5.

The front end of the bar A is inclined as shown in Fig. 1 so that the upper portion of the holder may be considerably removed from the blade of the bit while the lower portion projects sufficiently forward to support the bit close to the work. At the upper and lower edges of the bar, adjacent the front end, bosses, $a'$, $a'$ are formed for the bit clamping bolts C. Said bolts are each provided with an enlarged head $c$, and with a square shank $c'$ which enters a square hole $a^2$ passing through the stock from one side to the other at the bosses $a'$, $a'$, as clearly shown. The heads $c$ of the bolts are adapted to engage the bit or tool and clamp it against the bearing surfaces $b$ in the channel $a$, as shown in Figs. 1, 2 and 3, or against one of said surfaces and the bottom $b'$ of the channel, as indicated in Figs. 4 and 5. The screw threaded ends of the bolts C project through the bar sufficiently far to be engaged by clamping nuts $c^2$ which operate to draw the head of the bolt against the tool or bit, as will be readily understood.

As hereinbefore indicated, the width of the tool receiving channel is such that it will just receive a cutting-off tool placed in the channel against the steps or bearing surfaces $b'$ so that it may be clamped against said steps or surfaces as already described. A right hand facing tool B' is placed in the channel with its upper inner edge resting against the bottom of the channel and with its lower inner edge resting against the lower bearing surface $b$ as indicated in full lines in Fig. 4. The depth of the channel is such that a tool of this character will have a proper angular position with reference to the stock or holder A, and to afford a wide bearing or clamping surface, the bottom wall $b'$ of the channel is inclined from a longitudinal central line backwardly toward the sides of the channel as clearly shown in Figs. 3, 4 and 5. A left-hand facing tool is placed in the holder with its lower inner edge against the bottom wall of the channel and with its upper inner edge resting against the upper bearing surface $b$ as indicated in dotted lines in Figs. 4 and 5. It will thus be seen that the holder is adapted to receive and firmly hold in proper position, a cutting off tool or either a right or left hand facing tool.

To render the device of still wider usefulness, I provide means for holding another form of facing or turning tool at the opposite end of the stock. As shown in Figs. 1, 2 and 6, the bar or stock A is provided with a groove or channel $e$ on the side opposite to the channel $a$, said channel $e$ extending from the rear end of the stock downwardly and backwardly to a distance sufficient to receive a tool E, the channel being made a proper width and depth to accommodate the tool. The tool is clamped to the stock by means of a yoke $f$ through which the tool passes, said yoke being provided with a screw threaded shank which passes through a hole in the stock, and which is engaged by a nut on the opposite side of the stock as clearly shown in Fig. 6. The yoke operates to draw the tool firmly against the bottom or inner wall of the groove or channel as will be readily understood.

Having thus described my invention, what I claim as new and desire to secure by Letters Patent, is

1. A tool holder of the character described comprising a stock having a longitudinal channel designed to receive a flat tool or bit, the side walls of said channel being stepped to form clamping surfaces removed from the rear or bottom wall of the channel, said bearing surfaces at each side of the channel being adapted to coöperate with the other or with the bottom wall of the channel for positioning a flat bit or tool in a plane substantially parallel with the stock or at an angle thereto, and means for clamping the tool or bit in said channel.

2. A tool holder comprising a stock adapted to enter the tool post socket of a lathe, said stock being provided in one side with a longitudinal channel extending to one end of the stock, the side walls of said channel being stepped to form tool bearing surfaces removed from the bottom wall of the channel, the stepped bearing surfaces on each side of the channel being adapted to coöperate with each other or with the rear or bottom wall of the channel for properly positioning a cutting-off tool or a right or left hand facing tool, and means for clamping the tool in said channel.

3. A tool holder comprising a stock adapted to enter the tool post socket of a lathe, said stock being provided in one side with a longitudinal channel extending to the end of the stock, the side walls of said channel being stepped to form tool bearing surfaces removed from the bottom wall of the channel, the stepped bearing surfaces on each side of the channel being adapted to coöperate with each other or with the bottom or rear wall of the channel for properly positioning a cutting-off tool or a right or left hand facing tool, said stock being also provided with a second tool receiving channel on its opposite side extending to the other end of the stock, and means for clamping the tools in said channels.

CHARLES S. BONNEY.

Witnesses:
A. J. STATES,
E. M. SMITH.